United States Patent
K

(10) Patent No.: US 10,071,648 B1
(45) Date of Patent: Sep. 11, 2018

(54) AVOIDANCE OF ELECTRODE PLATING IN A BATTERY CELL

(71) Applicant: GM GLOBAL TECHNOLOGY OPERATIONS LLC, Detroit, MI (US)

(72) Inventor: Raghunathan K, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/495,426

(22) Filed: Apr. 24, 2017

(51) Int. Cl.
| | |
|---|---|
| H02P 1/00 | (2006.01) |
| B60L 11/18 | (2006.01) |
| H01M 10/0525 | (2010.01) |
| H01M 10/44 | (2006.01) |
| H01M 10/42 | (2006.01) |
| H01M 10/46 | (2006.01) |
| H02J 7/00 | (2006.01) |

(52) U.S. Cl.
CPC ..... B60L 11/1861 (2013.01); H01M 10/0525 (2013.01); H01M 10/425 (2013.01); H01M 10/44 (2013.01); H01M 10/46 (2013.01); H02J 7/007 (2013.01); *H01M 2010/4271* (2013.01); *H01M 2220/20* (2013.01)

(58) Field of Classification Search
CPC .. H01M 10/0525; H01M 10/48; H01M 10/44; H01M 4/133; H01M 4/136; H01M 4/5825; H01M 10/425; H01M 2/30; H01M 4/13; H01M 10/0587; H01M 2004/021; H01M 2010/4292; H01M 4/583; H01M 4/587
See application file for complete search history.

(56) References Cited

U.S. PATENT DOCUMENTS

| | | | |
|---|---|---|---|
| 7,261,979 B2 * | 8/2007 | Gozdz | H01M 4/13 429/218.1 |
| 7,348,101 B2 * | 3/2008 | Gozdz | H01M 4/13 429/218.1 |
| 8,163,410 B2 * | 4/2012 | Fulop | H01M 2/30 429/163 |
| 8,212,532 B2 * | 7/2012 | Kumar | B60L 3/0046 320/125 |
| 8,502,494 B2 * | 8/2013 | Nieh | H01M 4/525 320/101 |
| 8,541,122 B2 * | 9/2013 | Fulop | H01M 2/30 429/163 |
| 8,586,222 B2 | 11/2013 | Timmons et al. | |

(Continued)

*Primary Examiner* — Karen Masih
(74) *Attorney, Agent, or Firm* — Quinn IP Law

(57) ABSTRACT

A method avoids lithium plating of a negative electrode in a battery cell. A voltage level of a positive electrode is determined in an initial battery charging process having a charging power level. A charging rate is modified in response to the determined voltage by increasing or decreasing the charging rate when the voltage is respectively less or greater than a voltage threshold. A charging profile is recorded for the power level. A subsequent charging process at the same power level is controlled using the recorded profile, which is possibly age-indexed to an age of an actual battery used in the subsequent charging process. A system includes the battery cell and a battery cell cycler device programmed to execute the method. An electric machine may be connected to the battery cell and a load, with a controller controlling the subsequent charging process using the profiles.

20 Claims, 2 Drawing Sheets

(56) References Cited

U.S. PATENT DOCUMENTS

| | | | |
|---|---|---|---|
| 8,617,745 B2* | 12/2013 | Gozdz | H01M 4/133 429/231.5 |
| 8,981,727 B2* | 3/2015 | Kusch | B60L 11/1868 320/134 |
| 2005/0233219 A1* | 10/2005 | Gozdz | H01M 4/13 429/231.95 |
| 2005/0233220 A1* | 10/2005 | Gozdz | H01M 4/13 429/231.95 |
| 2009/0104510 A1* | 4/2009 | Fulop | H01M 2/30 429/50 |
| 2010/0019726 A1* | 1/2010 | Kumar | B60L 3/0046 320/125 |
| 2012/0109503 A1 | 5/2012 | Yang et al. | |
| 2012/0263986 A1* | 10/2012 | Fulop | H01M 2/30 429/91 |
| 2012/0268077 A1* | 10/2012 | Kumar | B60L 3/0046 320/155 |
| 2013/0002199 A1* | 1/2013 | Hu | H02J 7/0004 320/112 |
| 2013/0049684 A1* | 2/2013 | Kusch | B60L 11/1812 320/109 |
| 2013/0193914 A1* | 8/2013 | Gaddam | H02J 7/007 320/108 |
| 2013/0323542 A1* | 12/2013 | Wijayawardhana | H01M 4/00 429/50 |
| 2014/0023888 A1* | 1/2014 | Fulop | H01M 2/30 429/50 |
| 2014/0242445 A1* | 8/2014 | Gozdz | H01M 4/133 429/158 |
| 2015/0314690 A1* | 11/2015 | Buia | B60L 11/184 320/157 |
| 2016/0006272 A1* | 1/2016 | Greening | H02J 7/0008 320/162 |
| 2016/0006286 A1* | 1/2016 | Khandelwal | H02J 7/007 320/162 |
| 2017/0288421 A1* | 10/2017 | Greening | H02J 7/0008 |

* cited by examiner

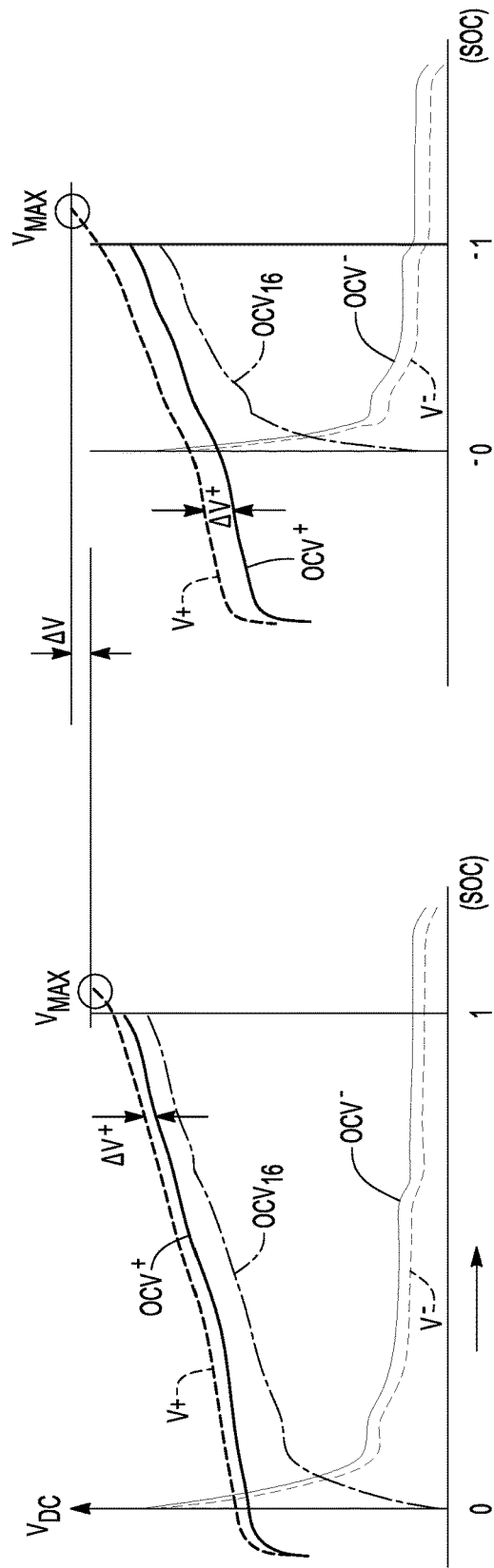

AVOIDANCE OF ELECTRODE PLATING IN A BATTERY CELL

INTRODUCTION

A multi-cell battery pack may be used as a direct current (DC) voltage supply in a powertrain or other electrified system. In a motor vehicle having an electric powertrain, for instance, a DC battery pack may energize phase windings of a high-voltage polyphase electric machine. In turn, the energized electric machine generates output torque at levels suitable for propelling the vehicle. Alternatively, the electric machine may use energy from the battery pack for other functions, such as to crank and start an internal combustion engine after an engine auto-stop event.

A lithium-ion battery is a particular battery chemistry that uses ion migration to provide an electrical current. Lithium-ion batteries are well suited for use in vehicular propulsion applications, as well as for powering computers or portable electronic devices requiring a relatively high energy-to-weight ratio, lack of memory effect, and slow self-discharge rate when the battery pack is not in use. Individual lithium-ion battery cells include positive and negative electrodes, generally referred to as a cathode and an anode, respectively, which are situated on opposite sides of a polymer separator and bathed in a lithium ion-conducting electrolyte solution. The separator in such a configuration is intended to prevent direct conductive contact between the electrodes within the battery cell.

A lithium-ion battery pack operates by reversibly passing lithium ions between the positive and negative electrodes within a given battery cell. Each electrode is connected to a metallic current collector, e.g., copper for the negative electrode and aluminum for the positive electrode. The current collectors allow electrical current passing between electrodes to electrically balance transport of the lithium ions through the battery cell. It is desirable in certain lithium-ion battery pack applications to closely monitor the electrical potential of the electrodes and a corresponding state of charge of the battery cell. One reason for this is that an electrode's electrical potential may be altered if, for example, the battery pack is too frequently and/or too rapidly overcharged or discharged. Either use pattern may result in a phenomenon known as lithium plating, which occurs on the external outer surfaces or the particles within the negative electrode. Therefore, a need exists for a technique that reduces the severity of lithium plating in a lithium-ion battery cell or other battery cells exhibiting similar ion migration.

SUMMARY

The present disclosure pertains to a method for reducing or avoiding lithium plating of a negative electrode in a lithium-based battery cell. As part of the present method, the voltage level of a positive electrode of the battery cell is determined during an initial direct current battery charging process. This determination may take place offline in a laboratory setting, e.g., using a commercially-available programmable battery cell cycler device, such as a commercially available programmable battery analyzer or test module having a suitable voltage or current output. The voltage level of the positive electrode is used as a feedback variable in determining a set of charging profiles, possibly with corresponding battery ages such that charging profiles are determined for new and for progressively aged battery cells. The charging profiles in turn are defined by a maximum charging power and maximum corresponding charging rate that does not result in lithium plating of the negative electrode. The charging profiles are recorded as calibration values, for instance as age-based or age-indexed entries in a lookup table within a memory device, and ultimately communicated to an onboard controller of a vehicle or other electrical system having the same type of battery cell. The recorded charging profiles are thereafter used by the onboard controller to control a subsequent battery charging process.

The maximum voltage experienced by the positive electrode tends to increase as the battery cell ages. This aging effect may be due to a combination of a gradual shift in an open circuit voltage and an increase in a positive electrode impedance of the battery cell. Recognized herein as a foundation of the present method, a relatively high voltage level of the positive electrode may contribute to long-term capacity loss of the battery cell. A possible tangible indicator of the progression of such capacity loss is occurrences of localized lithium plating on exposed surfaces of the negative electrode. Therefore, the charging profiles may be shaped in offline testing by carefully limiting the maximum voltage level of the positive electrode to avoid lithium plating in the manner disclosed herein.

According to an example embodiment, a method for minimizing lithium plating of the negative electrode in a lithium-based battery cell includes determining a direct current (DC) voltage level of a positive electrode of the battery cell during an initial DC battery charging process, e.g., in an offline/laboratory environment, with the initial DC battery charging process having a corresponding charging power level. Additional charging profiles may be determined for aged battery cells, e.g., for a plurality of different ages or distance traveled-based equivalents. The method includes modifying a charging rate and charging time of the initial DC charging process in response to the determined voltage level, e.g., via the battery cell cycler device noted above, including increasing the charging rate whenever the determined voltage level of the positive electrode is less than a calibrated voltage threshold and reducing the charging rate when the same voltage level equals or exceeds the calibrated voltage threshold.

Additionally, the method may include recording the charging profile for the corresponding charging power level in a memory device, with the recorded charging profile defined herein as the modified charging rate and charging time. A subsequent battery charging process of the battery cell occurring at the corresponding charging power level is thereafter controlled, e.g., via a separate onboard controller, using the recorded charging profile, such that lithium plating of the negative electrode is largely avoided.

The method may include determining the voltage level of the positive electrode during multiple initial DC charging processes, with each of the processes having a different corresponding charging power level. In such an embodiment, the method may include recording a corresponding one of the charging profiles for each of the charging power levels, and then selecting one of the recorded charging profiles during a subsequent battery charging process. The selected charging profile in this instance corresponds to an available charging power of the subsequent battery charging process, which may be communicated to an onboard controller by a DC charging station. Thereafter, the subsequent battery charging process is controlled via the onboard controller using the selected charging profile.

The method may optionally include energizing an electric machine using the battery pack after the subsequent battery charging process is completed. The electric machine in some configurations may be embodied as an electric traction motor aboard a vehicle. The method may also include propelling the vehicle using an output torque from the traction motor.

A system is also disclosed herein that includes a battery cell having positive and negative electrodes surrounded by an electrolyte solution, and a battery cell cycler device programmed to execute the method noted above. The system may further include an onboard controller, an electric machine, and a load, e.g., a transmission member connected to road wheels of a vehicle, with the electric machine powered by a plurality of the battery cells.

The above features and advantages, and other features and advantages of the present disclosure, will be readily apparent from the following detailed description of the embodiment (s) and best mode(s) for carrying out the disclosure when taken in connection with the accompanying drawings and appended claims.

BRIEF DESCRIPTION OF THE DRAWINGS

FIG. 2A is a graphical illustration of an example pattern of voltage variation as a function of state of charge in a new lithium-based battery pack, with voltage depicted on the vertical axis and state of charge depicted on the horizontal axis.

FIG. 2B is a graphical illustration of an example pattern of over-potential as a function of state of charge in an aged battery cell, with voltage depicted on the vertical axis and state of charge depicted on the horizontal axis.

DETAILED DESCRIPTION

Figure 1:
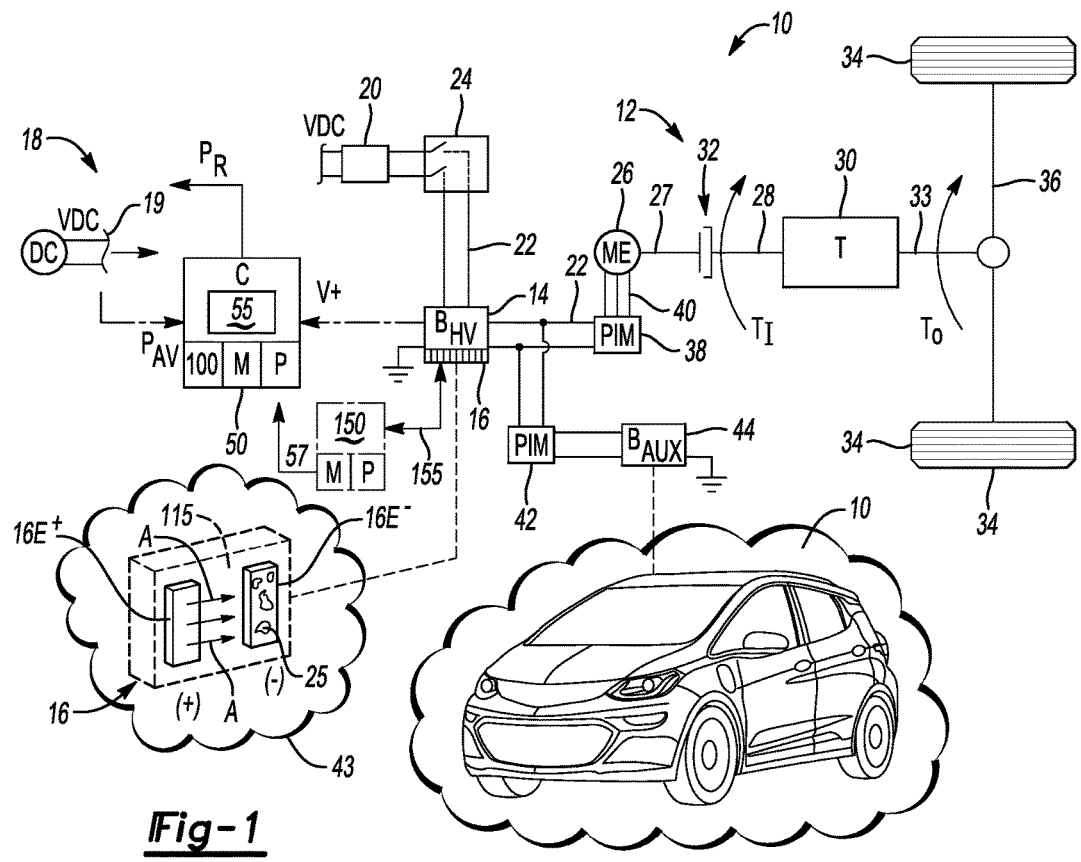
FIG. 1 is a schematic illustration of a vehicle having an example lithium-based battery pack that is rechargeable via an offboard direct current (DC) battery charging process, and a battery cell cycler device programmed to avoid localized lithium plating of a negative electrode of the battery cell using a method as set forth herein.

Referring to the drawings, wherein like reference numbers refer to like components, FIG. 1 depicts an example system in the form of a vehicle 10 having an electric powertrain 12. The electric powertrain 12 includes a rechargeable high-voltage direct current (DC) battery pack ($B_{HV}$) 14 having a plurality of battery cells 16. The battery pack 14 may be embodied as a lithium-ion or other lithium-based battery pack, e.g., with each battery cell 16 being a lithium-based battery cell. The present disclosure pertains to methods and systems for avoiding occurrence of localized lithium plating 25 of a negative electrode $16E^-$ of the battery cell 16 as set forth below with reference to FIGS. 1-3.

With respect to the non-limiting example application as an energy source within the vehicle 10 of FIG. 1, the battery pack 14 may be recharged via an offboard DC charging station 18, e.g., a DC fast-charging station, such as by using a modified J1771 SAE charging plug 19 and a DC charge coupler 20. The charging plug 19 has multiple data pins (not shown) enabling two-way communication between an onboard controller (C) 50 and the DC charging station 18, as well as high-amperage DC power transfer to the battery pack 14. This capability allows the onboard controller 50 to receive an available power level (arrow $P_{AV}$) from the DC charging station 18, and to request a particular charging rate (arrow PR), i.e., charging power per unit time, from the DC charging station 18. A DC voltage (VDC) delivered from the DC charging station 18 may be delivered directly to the battery pack 14 via the DC charge coupler 20 or to a DC voltage bus 22 via a voltage regulator 24 having internal semiconductor and/or mechanical switches.

The battery pack 14 may also be recharged at a slower rate via an offboard alternating current (AC) charging station in a polyphase conductive charging system embodiment. Associated AC charging hardware is omitted from FIG. 1 for illustrative simplicity. The availability of DC charging as an option in the vehicle 10, particularly a DC fast-charging operation, may reduce the total charging time relative to AC-based charging methods. However, the substantially higher voltage levels and faster charging rates of a DC fast-charging process may lead to non-homogenous or "spotty" instances of the lithium plating 25 on exposed external surfaces of the battery cell 16 as shown in inset 43 of FIG. 1. Lithium plating 25 may be largely minimized and thus, for practical purposes, largely avoided via a method 100 as described in further detail with reference to FIGS. 2A, 2B, and 3.

The electric powertrain 12 of FIG. 1 may include one or more electric machines ($M_E$) 26. While a single electric machine 26 is depicted in FIG. 1, more than one electric machine 26 may be present in other embodiments. The electric machine 26 may be embodied as a polyphase/AC device as shown or a DC device. A rotor shaft 27 of the electric machine 26 may be selectively connected to a load, e.g., an input member 28 of a transmission (T) 30, via operation of a clutch 32 to deliver input torque (arrow $T_I$) to the input member 28 when the electric machine 26 is operated as an electric traction motor, or the electric machine 26 may be operated as a generator. For instance, output torque (arrow $T_O$) from the energized electric machine 26 may be directed to the input member 28 and/or to another load in the form of an output member 33 of the transmission 30 depending on the configuration of the electric powertrain 12. Output torque (arrow $T_O$) from the transmission 30 is then transmitted to a set of drive wheels 34 via one or more drive axles 36. Power flow may be reversed during a regenerative event such as regenerative braking in order to charge the battery pack 14, i.e., with regenerative torque from the rotating electric machine 26 generating electricity that is fed to the battery pack 14 so as to increase or maintain a state of charge of the individual battery cells 16.

When the electric machine 26 is embodied as an AC device as shown, the electric powertrain 12 includes a power inverter module (PIM) 38 that is electrically connected to the battery pack 14 via the high-voltage DC voltage bus 22. Internal semiconductor switches (not shown) of the PIM 38 are automatically controlled via pulse width modulation signals or other suitable switching techniques in order to generate an AC output voltage suitable for energizing the electric machine 26. An AC voltage bus 40 is therefore used to electrically connect the PIM 38 to the individual phase windings of the electric machine 26. A DC-DC voltage converter/auxiliary power module (APM) 42 may be used to reduce a voltage level of the DC voltage bus 22 to a lower auxiliary level, e.g., 12-15 VDC, which in turn may be stored in an auxiliary battery pack ($B_{AUX}$) 44 for use in energizing low-voltage electrical systems aboard the vehicle 10.

As shown schematically in FIG. 1 via the inset 43, each battery cell 16 includes respective positive and negative electrodes $16E^+$ and $16E^-$ situated on opposite sides of a porous polymer separator (not shown) and bathed in a lithium-ion-conducting electrolyte solution 15, as well as the current collectors (not shown) and other associated battery structure as noted above. In a non-limiting example embodiment, the positive electrode 16E$^+$ may be constructed of a combination of nickel, manganese, and cobalt (NMC) as well as various binders, manufacturing byproducts, atmospheric contaminants, and other miscellaneous trace materials. The negative electrode 16E$^-$ may be constructed of graphite in the same embodiment. Other battery constructions may benefit from the method 100 disclosed herein, and therefore the particular battery chemistry may vary, such as but not limited to use in batteries having positive electrodes containing iron, titanium, and aluminum as well as negative electrodes containing iron.

As noted above, use of the method 100 avoids non-homogenous lithium plating 25 on surfaces of the negative electrode 16E$^-$, and is therefore intended to help minimize battery capacity loss. The occurrence of lithium plating 25 may be strongly influenced by the existence of a high electrical potential or overvoltage of the positive electrode 16E$^+$, which may gradually decompose the electrolyte solution 15 and dissolve the constituent NMC materials, sodium, and other trace materials. The decomposed materials tend to migrate toward the negative electrode 16E$^-$ in the direction of arrows A, eventually adhering to the outer surfaces of the negative electrode 16E$^-$ as localized spots or patches. Over time, the total area of the lithium plating 25 may effectively plate the entirety of the negative electrode 16E$^-$. As a result, the lithium plating 25 may lead to undesirable effects such as loss of capacity and solid electrolyte interphase (SEI) layer deconstruction of the battery cell 16.

While the capacity of a lithium-ion battery pack tends to gradually decrease over time, premature formation of spotty lithium plating 25 on the negative electrode 16E$^-$ may exacerbate the magnitude and/or rate of progression of capacity loss. The maximum voltage experienced by the positive electrode 16E$^+$ also increases as the battery cell 16 ages. This effect may be due to a combination of a gradual shift in the open-circuit voltage and an increase in positive impedance of the battery cell 16. Thus, a control action envisioned within the scope of the present method 100 includes automatically generating a set of charging profiles 55 for use in subsequent DC charging of the battery pack 14, with the charging profiles 55 individually shaped and limited by control of the maximum voltage of the positive electrode 16E$^+$ in the manner disclosed herein.

The onboard controller 50, once the charging profiles 55 are determined by and uploaded from a battery cell cycler device 150, as indicated in FIG. 1 by arrow 57, may control the battery charging process according to the charging profiles 55. The controller 50 may be embodied as computer devices having requisite memory (M) and a processor (P), as well as any other necessary hardware and software, e.g., a clock or timer, input/output circuitry, etc. Memory (M) includes sufficient amounts of read only memory, for instance magnetic or optical memory.

Some portions of the method 100 may be executed as part of an offline calibration process to generate the charging profiles 55 for a given make and model of the vehicle 10, with the charging profiles 55 thereafter used in vehicles 10 having the same make and model. Alternatively, charging profiles 55 may be generated onboard the vehicle 10 by the onboard controller 50 using measured or modeled data for the particular vehicle 10, thus adapting the charging profiles 55 to the aging and performance of the vehicle 10. Both options are described in further detail below with reference to FIG. 3.

With respect to the changes in voltage of the battery cell 16 of FIG. 1 with age, FIGS. 2A and 2B respectively depict charging of an example new battery cell 16 and charging of such a battery cell 16 after an extended aging period, e.g., after 45,000 miles of driving when used as part of the vehicle 10. The state of charge (SOC) of the battery cell 16 ranges from a nominal level of 0 for a totally depleted battery cell 16 to a nominal level of 1 for a fully charged battery cell 16. The open-circuit voltage of the battery cell 16 as a whole is represented by trace OCV$_{16}$. The open-circuit voltages of the positive and negative electrodes 16E$^+$ and 16E$^-$ are represented by respective traces OCV$^+$ and OCV$^-$.

When the battery cell 16 is actively charging, the positive potential (trace V$^+$) rises relative to the positive open-circuit voltage (trace OCV$^+$) by an amount indicated by a positive voltage differential ($\Delta$V$^+$). Similarly, the negative potential (trace V$^-$) dips during the same charging interval to a lower level as indicated by a negative voltage differential ($\Delta$V$^-$). The present method 100 generates a DC charging profile for multiple different charging power levels from the DC charging station 18 of FIG. 1 by closely monitoring the positive potential (trace V$^+$) as it rises toward a calibrated maximum voltage (V$_{MAX}$) and then, in response to the positive potential, increasing or decreasing a charging rate in response to measured changes in the positive potential (trace V$^+$). Preventing the negative potential (trace V$^-$) from dropping below 0 VDC may also help address some of the lithium plating problems noted above, and therefore the positive potential (trace V$^+$) may be used as a feedback variable either alone or in conjunction with the negative potential (trace V$^-$) in different embodiments.

As can observed by comparing the traces of FIGS. 2A and 2B, the positive voltage differential ($\Delta$V$^+$) tends to increase with age of the battery cell 16. FIG. 2B shows that as the battery cell 16 ages, the negative open-circuit voltage (trace OCV) increases relative to the new state of FIG. 2A for the same battery cell 16. To maintain the open-circuit voltage (trace OCV$_{16}$), the positive OCV (trace OCV) also has to increase, i.e., OCV$^+$=OCV$_{16}$+OCV$^-$. Along with the increase in positive OCV, the positive impedance and positive over-potential of the battery cell 16 increases. The result is a net increase in maximum potential (V$_{MAX}$) at the positive electrode 16E$^+$, the resultant decomposition of the electrolyte solution 15 and dissolution of constituent materials of the positive electrode 16E$^+$, and thus an increase in a rate of accumulation of lithium plating.

Figure 3:
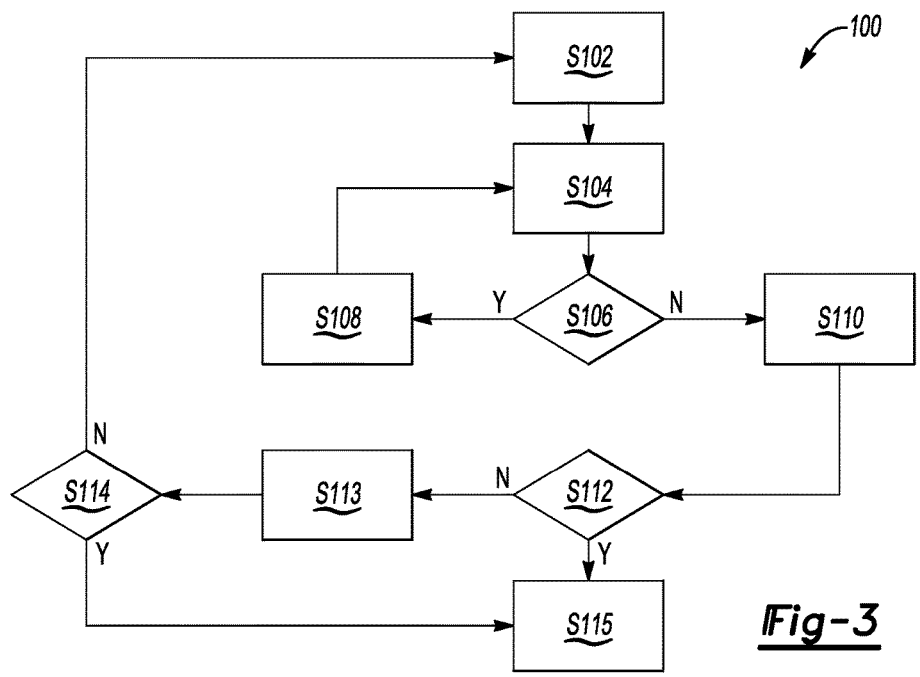
FIG. 3 is a flow chart describing a method for minimizing localized lithium plating of the negative electrode of a lithium-based battery cell.

Referring to FIG. 3, the method 100 may be performed in a controlled laboratory setting. For instance, steps S102-S114 of the method 100 may be conducted offline by the battery cell cycler device 150 of FIG. 1 for a reference battery pack 14 during a design or validation phase of production, e.g., or in a controlled laboratory setting, with the reference battery pack 14 being representative of a battery pack used in a particular make and model of vehicle 10. The battery cell cycler device 150 in this embodiment may charge the battery cell 16 via charging signals (arrow 155), typically in the form of a commanded electrical current. As is understood, battery testers such as the battery cell cycler device 150 may connect to multiple battery cells 16 and produce the charging signals (arrow 155) as commanded, e.g., via Ethernet or coaxial cable.

The method 100 in its entirety may be alternatively conducted in real-time aboard the vehicle 10 via the controller 50 so as to adapt and customize resultant charging profiles for the particular vehicle 10. Similarly, a fleet of the vehicles 10 may transmit data to the controller 50 that is remotely located with respect to the vehicles 10 in the fleet, e.g., via a vehicle telematics unit (not shown). The collective data from the various vehicles 10 may be combined in a suitable manner, such as by averaging for various different mileage ranges indicative of aging of the battery pack 14, and otherwise combined and used to update the charging profiles 55 consistently for the entire fleet.

Commencing with step S102, which once again may occur offline via the battery cell cycler device 150 in a controlled laboratory setting or during a calibration phase of production, the method 100 includes subjecting the battery pack 14 to an initial DC battery charging process at a first power level and charging rate. Step S102 may include connecting the battery pack 14 to the battery cell cycler device 150 and then starting the initial DC charging process via charging signals (arrow 155). The available power level (arrow $P_{AV}$) in the controlled laboratory environment is known, and is thus a calibrated value. The battery cell cycler device 150 thereafter controls the charging rate at a corresponding power level by controlling the current flowing into the battery cell 16 being tested.

Step S102 may optionally entail conducting multiple DC battery charging processes for progressively aged battery packs 14, such that the initial charging process noted above may include multiple different age-specific charging processes. The battery cell cycler device 150 may, for instance, execute simulated aging of the battery pack 14 using an aging protocol, such that the "aged" battery pack 14 or cells thereof are aged in software as opposed to requiring physical battery packs 14 of a corresponding age or use level. That is, aged battery cells 16 behave differently than new ones during charging and discharging, and thus the method 100 may encompass performing different age-based charging processes. The method 100 continues to step S104 while the initial DC battery charging process or age-indexed processes are progressing.

Step S104 includes determining the voltage level of the positive electrode 16E⁺ while the initial DC battery charging operations of step S102 continue. A possible approach for executing step S104 is to measure a total cell voltage and then estimate or calculate the voltage of the positive electrode 16E⁺. Alternatively, a reference electrode at a calibrated reference voltage ($V_{REF}$) may be connected between the positive and negative electrodes 16E⁺ and 16E⁻, followed by measurement of a voltage level (V⁺) of the positive electrode 16E⁺ and then subtraction of the reference voltage ($V_{REF}$), i.e., $V^+ = V^+_{MEAS} - V_{REF}$. An example of such a reference electrode-based measurement technique is disclosed in U.S. Pat. No. 8,586,222, the contents of which are hereby incorporated by reference in its entirety. The method 100 then proceeds to step S106.

At step S106, the determined positive voltage level (V⁺) from step S104 is compared to a calibrated voltage limit, e.g., between 3.8-4.1 VDC, or generally less than 5 VDC in an example embodiment. The calibrated voltage limit may correspond to the maximum voltage ($V_{MAX}$) shown in FIGS. 2A and 2B. The method 100 proceeds to step S108 if the positive voltage (V⁺) has not reached the calibrated voltage limit. The method 100 proceeds in the alternative to step S110 when the positive voltage (V⁺) reaches the calibrated voltage limit.

Step S108 includes reducing increasing the charging rate at the present charging power level if the determined positive voltage level (V⁺) is less than the calibrated voltage limit, e.g., the maximum voltage ($V_{MAX}$). For instance, current output of the battery cell cycler device 150 may be increased to cause a resultant increase in charging rate. The method 100 then repeats step S104.

Step S110 includes continuing the initial DC charging process or multiple initial/aged processes until a calibrated state of charge is attained, e.g., a state of charge of 0.8 or 80% of a maximum charge. The battery cell cycler device 150 may then reduce the first charging rate to a second, slower charging rate so as to slowly top off the charge level of the battery cells 16. Such a multi-step tapering of the charging rate may help to reduce stress on the battery cell 16. The first charging rate corresponding to the power level used for the initial and aged DC charging process is then recorded as a calibration value in a memory device, e.g., memory (M) of the battery cell cycler device 150 or a separate memory device, i.e., a first charging rate R1 for the first power level, a second charging rate R2 for a second power level, etc. The method 100 proceeds to step S112.

Step S112 includes determining whether additional power levels remain. That is, charging power may vary depending on the capabilities of the battery cell cycler device 150, e.g., varying from 40 kW to 100 kW or more. Optimization of the method 100 may be realized by repeating the method 100 for a plurality (N) of different power levels to generate a corresponding calibration value for each such power level. For instance, N=4 with four example charging levels of 40 kW, 60 kW, 80 kW, and 100 kW. Step S112 proceeds to step S113 when each of the N power levels has not been evaluated, and to step S114 when the N power levels have been evaluated.

Step S113 may include incrementing a counter ($N_C$) and then proceeding to step S115. That is, after evaluating a first power level P1, with at least one additional power level to evaluate, step S113 would increment the counter ($N_C$) from 1 to 2 before proceeding to step S115.

At step S114, the method 100 may include comparing the present value of the counter ($N_C$) of step S113 to N to determine if further charging power levels remain for evaluation. The method 100 returns to step S102 when $N_C<N$, and to step S115 when $N_C=N$.

At step S115, the method 100 includes executing a control action aboard the vehicle 10 using the recorded charging profiles 55 generated via steps S102-S114 of the method 100. As an illustrative example, a vehicle 10 of a given make and model year may be evaluated offline for N different charging power levels. The method 100 in this instance would be executed for each of the N power levels, with a corresponding charging profile 55, defined as the charging rate and time, adjusted in response to the positive voltage (V⁺) and recorded in memory (M) as a calibration value. The controller 50 may be populated with a number (N) of corresponding charging profiles 55, with such charging profiles 55 transmitted to the controller 50 or otherwise transferred from memory (M) of the battery cell cycler device 150. Thus, when the example vehicle 10 is in operation is subsequently subjected to a subsequent DC charging process having a given available charging power (arrow $P_{AV}$), the controller 50 may extract the corresponding charging profile 55 that matches the available charging power and control the subsequent DC charging process(es) according to the extracted charging profile 55. The controller 50 may thereafter energize the electric machine 26 via control of the charged battery pack 14 to.

As noted above, a battery cell 16 exhibits different charging characteristics and responses as the battery cell 16 ages. Therefore, the initial laboratory portions of the method 100 may be repeated for different actual or simulated ages of the battery pack 14, or a suitable surrogate value such as distances traveled, e.g., 15,000 miles, 30,000 miles, 45,000 miles, etc. The recorded charging profiles 55 could therefore potentially include different age-based or age-indexed charging profiles. For example, for a battery pack 14 that has been used for 30,000 miles aboard the vehicle 10, and with an available charging power level of 60 kW, the controller 50 in may extract a corresponding 60 kW age-indexed charging profile 55 from memory (M) that corresponds, as closely as possible, to the 30,000 mile "age" of the battery cells 16. The method 100 may thereafter include controlling a subsequent DC charging process for a given battery pack 14 of a known age using a particular one of the recorded age-indexed charging profiles 55 having a corresponding age that is equal to or about, i.e., within the shortest distance of, the known age of the battery pack 14 being charged.

As an alternative to offline calibration, the method 100 may be executed in real-time aboard the vehicle 10. Such an approach would require the addition of suitable sensory hardware, such as the reference electrodes as noted above, so as to accurately measure, estimate, or otherwise determine the positive voltage ($V^+$) during a real-time charging operation. However, in spite of the additional hardware cost, a possible benefit of an individual hardware based approach may be an improved ability to adapt the charging profiles 55 to an actual demonstrated performance and aging of the battery cells 16 in a particular vehicle 10 as opposed to using fleet-wide fixed or adapted calibrations. The additional hardware cost may be at least partially offset by having customized charging profiles 55 that more closely match the battery pack 14 as used in a given vehicle 10.

Using the method 100 aboard the vehicle 10 of FIG. 1 or in another system having a similar battery pack 14, the maximum positive potential experienced by the positive electrode 16E$^+$ may be limited to reduce capacity loss of the battery cells 16. An observable physical effect of the method 100 on the battery pack 14 is a reduction in local inhomogeneity of the negative electrode 16E$^-$, which as postulated herein may be a root cause of the lithium plating 25. Furthermore, by using the method 100 in a desired combination of offline calibration and real-time application, DC charging protocols may be developed that do not compromise the performance, life, or structural integrity of the battery pack 14. Ultimately, the generation and application of the charging profiles 55 as set forth herein may be beneficially employed to reduce overall charging times of the battery pack 14.

While aspects of the present disclosure have been described in detail with reference to the illustrated embodiments, those skilled in the art will recognize that modifications may be made thereto without departing from the scope of the present disclosure. The present disclosure is not limited to the precise construction and compositions disclosed herein. Modifications or variations stemming from the foregoing descriptions are within the scope of the disclosure as defined in the appended claims. Moreover, the present concepts expressly include combinations and subcombinations of the preceding elements and features.

I claim:

1. A method for regulating charging of a lithium-based battery cell having a negative electrode and a positive electrode, the method comprising:
   determining, via a programmable electronic device electrically connected to the battery cell, a direct current (DC) voltage level of the positive electrode of the battery cell during an initial charging process of the battery cell, wherein the initial charging process has a corresponding charging power level;
   modifying, via the programmable electronic device, a charging rate and charging time of the initial charging process in response to the determined DC voltage level, the modifying including increasing the charging rate responsive to the determined DC voltage level being less than a calibrated voltage threshold and reducing the charging rate responsive to the determined DC voltage level being equal to or exceeding the calibrated voltage threshold;
   recording a charging profile, in a memory device, for the corresponding charging power level, wherein the recorded charging profile is defined as the modified charging rate and charging time for the charging power level; and
   controlling a subsequent DC charging process of the battery cell, via the programmable electronic device, at the corresponding charging power level using the recorded charging profile, such that the lithium plating of the negative electrode is avoided.

2. The method of claim 1, further comprising:
   determining a respective DC voltage level of a respective positive electrode for each of multiple battery cells each having a different age;
   recording a respective charging profile for each of the multiple battery cells as age-indexed charging profiles; and
   controlling the subsequent DC charging process for a battery pack of a known age using a corresponding one of the recorded age-indexed charging profiles having a corresponding age that is the same or about the same as the known age.

3. The method of claim 1, wherein the calibrated voltage threshold is less than or equal to 5 VDC.

4. The method of claim 1, further comprising:
   determining respective DC voltage levels of the positive electrode during a plurality of initial DC charging processes, each of the plurality of initial DC charging processes having a different corresponding charging power level;
   recording a corresponding one of the charging profiles for each of the charging power levels;
   selecting one of the recorded charging profiles via the controller during the subsequent charging process, wherein the selected recorded charging profile corresponds to an available charging power of the subsequent charging process; and
   controlling the subsequent charging process via the controller using the selected recorded charging profile.

5. The method of claim 4, wherein controlling the subsequent charging process includes detecting an available charging power from a DC fast charging station.

6. The method of claim 1, wherein the battery cell is part of a battery pack, the method further comprising energizing an electric machine via the battery pack after completing the subsequent charging process.

7. The method of claim 6, wherein the electric machine is a traction motor aboard a vehicle and energizing the electric machine includes energizing the traction motor sufficiently for propelling the vehicle using a torque output from the traction motor.

8. The method of claim 1, wherein determining the DC voltage level of the positive electrode includes directly measuring the DC voltage level of the positive electrode.

9. The method of claim 1, wherein the positive electrode is constructed of combination of nickel, manganese, and cobalt, and the negative electrode is constructed of graphite.

10. A system comprising:
   a lithium-based battery cell having positive and negative electrodes surrounded by an electrolyte solution; and a battery cell cycler device configured to:
    determine a direct current (DC) voltage level of the positive electrode during an initial charging process of the battery cell, wherein the initial charging process has a charging power level;
    modify a charging rate of the initial charging process in response to the determined DC voltage level, the modifying including increasing the charging rate responsive to the determined DC voltage level being less than a calibrated voltage threshold and reducing the charging rate responsive to the determined DC voltage level being equal to or exceeding the calibrated voltage threshold; and
    record a charging profile in a memory device as the modified charging rate and the corresponding charging power level, wherein the charging profile is sufficient for avoiding lithium plating of the negative electrode.

11. The system of claim 10, further comprising a controller programmed to execute a subsequent charging process of the battery cell at the corresponding charging power level using the recorded charging profile.

12. The system of claim 11, wherein the battery cell cycler device is further configured to:
    determine respective DC voltage levels of the positive electrode during a plurality of initial charging processes, each of the initial charging processes having a different corresponding charging power level; and
    record a corresponding one of the charging profiles for each of the charging power levels; and
    wherein the controller is further programmed to:
    select one of the recorded charging profiles during the subsequent charging process corresponding to a charging power of the subsequent charging process; and
    control the subsequent charging process using the selected charging profile.

13. The system of claim 11, wherein the battery cell cycler device is further configured to:
    determine a respective DC voltage level of a respective positive electrode during a plurality of initial charging processes for each of a plurality of different batteries each having a different corresponding age; and
    record a corresponding one of the charging profiles for each of the corresponding ages as an age-indexed charging profile;
    wherein the controller is further programmed to:
    select one of the recorded age-indexed charging profiles during the subsequent charging process corresponding to an age of an actual battery being charged in the subsequent charging process; and
    control the subsequent charging process using the selected age-indexed charging profile.

14. The system of claim 10, wherein the positive electrode is constructed of combination of nickel, manganese, and cobalt, and the negative electrode is constructed of graphite.

15. The system of claim 10, wherein the positive electrode is constructed of iron, titanium, and/or aluminum, and the negative electrode contains iron.

16. The system of claim 10, further comprising:
    an electric machine connected to the battery cell via a voltage bus and having an output member; and
    a load driven by output torque from the output member of the electric machine.

17. The system of claim 16, wherein the load is an input member or an output member of a vehicle transmission.

18. The system of claim 10, wherein the calibrated voltage threshold is less than or equal to 5 VDC.

19. The method of claim 1, wherein the programmable electronic device includes an onboard controller of a motor vehicle and/or a battery cell cycler device offboard from the motor vehicle.

20. An electric drive motor vehicle, comprising:
    a vehicle body;
    a plurality of road wheels rotatably attached to the vehicle body;
    an electric motor attached to the vehicle body and configured to drive one or more of the road wheels;
    a rechargeable battery pack attached to the vehicle body and configured to power the electric motor, the rechargeable battery pack including a lithium-based battery cell with a negative electrode, a positive electrode, a polymeric separator interposed between the positive and negative electrodes, and an electrolyte solution configured to conduct ions between the positive and negative electrodes;
    an onboard memory device; and
    an onboard controller communicatively connected to the battery pack and the onboard memory device, the onboard controller being programmed to:
    start an initial charging process of the battery cell, the initial charging process having an initial charging power level;
    determine a direct current (DC) voltage level of the positive electrode during the initial charging process of the battery cell;
    compare the determined DC voltage level to a calibrated voltage threshold;
    increase a charging rate of the battery cell responsive to the determined DC voltage level being less than the calibrated voltage threshold;
    decrease the charging rate of the battery cell responsive to the determined DC voltage level being equal to or above the calibrated voltage threshold;
    record, in the onboard memory device, a charging profile corresponding to the charging power level based on the increased or decreased charging rate; and
    control a subsequent DC charging process of the battery cell at the corresponding charging power level using the recorded charging profile.

* * * * *